United States Patent [19]
Dake et al.

[11] Patent Number: 5,436,959
[45] Date of Patent: Jul. 25, 1995

[54] COMMUNICATION TERMINAL HAVING FUNCTIONS OF DETECTING AND PREVENTING LINE BRANCH

[75] Inventors: Hideki Dake; Masao Komatsu, both of Kawasaki, Japan

[73] Assignee: Fujitsu Limited, Kawasaki, Japan

[21] Appl. No.: 222,838

[22] Filed: Apr. 5, 1994

[30] Foreign Application Priority Data

Sep. 20, 1993 [JP] Japan .................. 5-233565

[51] Int. Cl.[6] .......................... H04M 1/24
[52] U.S. Cl. .......................... 379/7; 379/35; 379/164
[58] Field of Search .......... 379/32, 33, 34, 35, 379/145, 164, 188, 189, 194, 27, 28, 31, 199, 200, 7

[56] References Cited

U.S. PATENT DOCUMENTS 4,969,178  11/1990  Chen et al. ................ 379/33

FOREIGN PATENT DOCUMENTS 0239455   3/1987  European Pat. Off. ........... 379/188
2205216A  11/1988  United Kingdom ............... 378/189

Primary Examiner—Stephen Chin
Assistant Examiner—Kevin Kim

[57] ABSTRACT

A communication terminal connected to a line of an exchange of a public network, includes a main body of the communication terminal, and a line branching detection controller coupled to the main body. The line branching detection controller includes a communication state detector enabling the communication terminal to call and receive a call when a communication operation of the communication terminal is detected, a line signal monitoring part activated when the communication state detector detects no communication operation and monitoring signals on the line connected to the exchange when activated, and an interference signal generator driven when the line signal monitoring part detects a signal indicating a communication made on the line and generating an interference signal on the line when driven.

13 Claims, 3 Drawing Sheets

5,436,959

COMMUNICATION TERMINAL HAVING FUNCTIONS OF DETECTING AND PREVENTING LINE BRANCH

BACKGROUND OF THE INVENTION

The present invention generally relates to communication terminals, and more particularly to a communication terminal having the functions of detecting and preventing a line (or line) branch in a telephone or the like.

Recently, various chargeable services utilizing the public line have been provided.

According to such a service, the charge for use is normally made for each line (public line) which is connected to the communication terminal of the subscriber. Since the charge is proportional to the using time and the number of times used, the charge made becomes considerable if the service is used frequently. On the other hand, communications made by unauthorized or illegal use of a line connected to someone else's communication terminal by making a branch have actually occurred, and there are demands to prevent such unauthorized or illegal use of the line.

In the case of a conventional analog telephone line, an authorized subscriber (or user) of the line calls the other end from the communication terminal such as a telephone set and a facsimile via the line and a switching station. The authorized subscriber makes a communication such as a voice communication and a facsimile communication, and the charge for this communication is made to the authorized subscriber of the line. However, information providing services such as the so-called dial Q2 service available in Japan have become available to the user. According to the information providing service, the user calls an information provider of this service, and the information provider provides the user with various information sometimes depending on inputs made by the user from his telephone. According to the information providing service, the charge made is proportional to the amount of information received by the user (caller). Normally, the charge of the information providing service is determined per unit time, and the user, that is, the subscriber of the line, is charged for the information providing service.

When the information providing service such as the above dial Q2 service is used, the charge made to the communication terminal connected to the public line includes in addition to the normal (or base) charge for using the public line the additional charges for using the information providing service. For this reason, the total charge to the subscriber becomes considerably high if the information providing services are frequently used, and unauthorized or illegal use of someone else's line by branching has become a problem. In other words, the unauthorized or unauthorized user steals and uses someone else's line by making an unauthorized branching, so as to reduce his personal costs of receiving the information providing service.

In the case of an integrated services digital network (ISDN) line, an individual user identification (ID) is provided for each connecting unit, so that it is possible to check the user ID in the network (switching station) and preventing the line from being stolen. However, in the case of the analog line, the public switched network cannot check whether or not the communication terminal belongs to the authorized user because there is no user ID, and it is impossible to prevent stealing of the line by an unauthorized or illegal branching made from a communication terminal of an unauthorized user. In addition, if the analog line were to have check functions similar to those provided by the ISDN line, it would become necessary to change the communication procedure (protocol), and this approach would be impractical since it would require considerable modification of the communication terminals and the exchanges.

SUMMARY OF THE INVENTION

Accordingly, it is a general object of the present invention to provide a novel and useful communication terminal in which the problems described above are eliminated.

An object of the present invention is to provide a communication terminal equipped with the function of detecting and preventing a line branching without requiring a modification in the communication protocol currently in use.

Another and more specific object of the present invention is to provide a communication terminal connected to a line of an exchange of a public network, comprising a main body of the communication terminal, and a line branching detection controller coupled to the main body, where the line branching detection controller comprises a communication state detector enabling the communication terminal to call and receive a call when a communication operation of the communication terminal is detected, a line signal monitoring part activated when the communication state detector detects no communication operation and monitoring signals on the line connected to the exchange when activated, and an interference signal generator driven when the line signal monitoring part detects a signal indicating a communication made on the line and generating an interference signal on the line when driven. According to the communication terminal of the present invention, it possible to detect a line branching in real time and to send an interference signal immediately upon detection of the line branching. Hence, a communication made by unauthorized use of the line can be interfered by the interference signal. In addition, when the line branching is detected, it is possible to immediately notify the exchange of the line branching. Thus, the unauthorized person making the line branching can be located quickly, and turned in to the local authorities.

Still another object of the present invention is to provide a line branching detection controller adapted to a communication terminal connected to a line of an exchange of a public network, comprising a communication state detector enabling the communication terminal to call and receive a call when a communication operation of the communication terminal is detected, a line signal monitoring part activated when the communication state detector detects no communication operation and monitoring signals on the line connected to the exchange when activated, and an interference signal generator driven when the line signal monitoring part detects a signal indicating a communication made on the line and generating an interference signal on the line when driven. According to the line branching detection controller of the present invention, it possible to detect a line branching in real time and to send an interference signal immediately upon detection of the line branching. Hence, a communication made by unauthorized use of the line can be interfered by the interference signal. In addition, when the line branching is detected, it is possible to immediately notify the exchange of the line branching. Thus, the unauthorized person making the line branching can be located quickly, and turned in to the local authorities.

A further object of the present invention is to provide a system for detecting a line branch from a first line of an exchange of a public network, comprising a first communication terminal connected to the first line, and a line branching detection controller coupled to the first communication terminal, where the line branching detection controller comprises a communication state detector enabling the communication terminal to call and receive a call when a communication operation of the communication terminal is detected, a line signal monitoring part activated when the communication state detector detects no communication operation and monitoring signals on the first line connected to the exchange when activated, an interference signal generator driven when the line signal monitoring part detects a signal indicating a communication made on the first line and generating an interference signal on the first line when driven, and a second communication terminal, located near the first communication terminal, connected to the exchange via a second line which independent from the first line, where the abnormality notifying part notifies the detection of the line branching to the second communication terminal when driven in response to the activation of the interference signal generator. According to the system of the present invention, it possible to detect a line branching in real time and to send an interference signal immediately upon detection of the line branching. Hence, a communication made by unauthorized use of the line can be interfered by the interference signal. In addition, when the line branching is detected, it is possible to immediately notify the exchange of the line branching. Thus, the unauthorized person making the line branching can be located quickly, and turned in to the local authorities.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 1.

Figure 1:
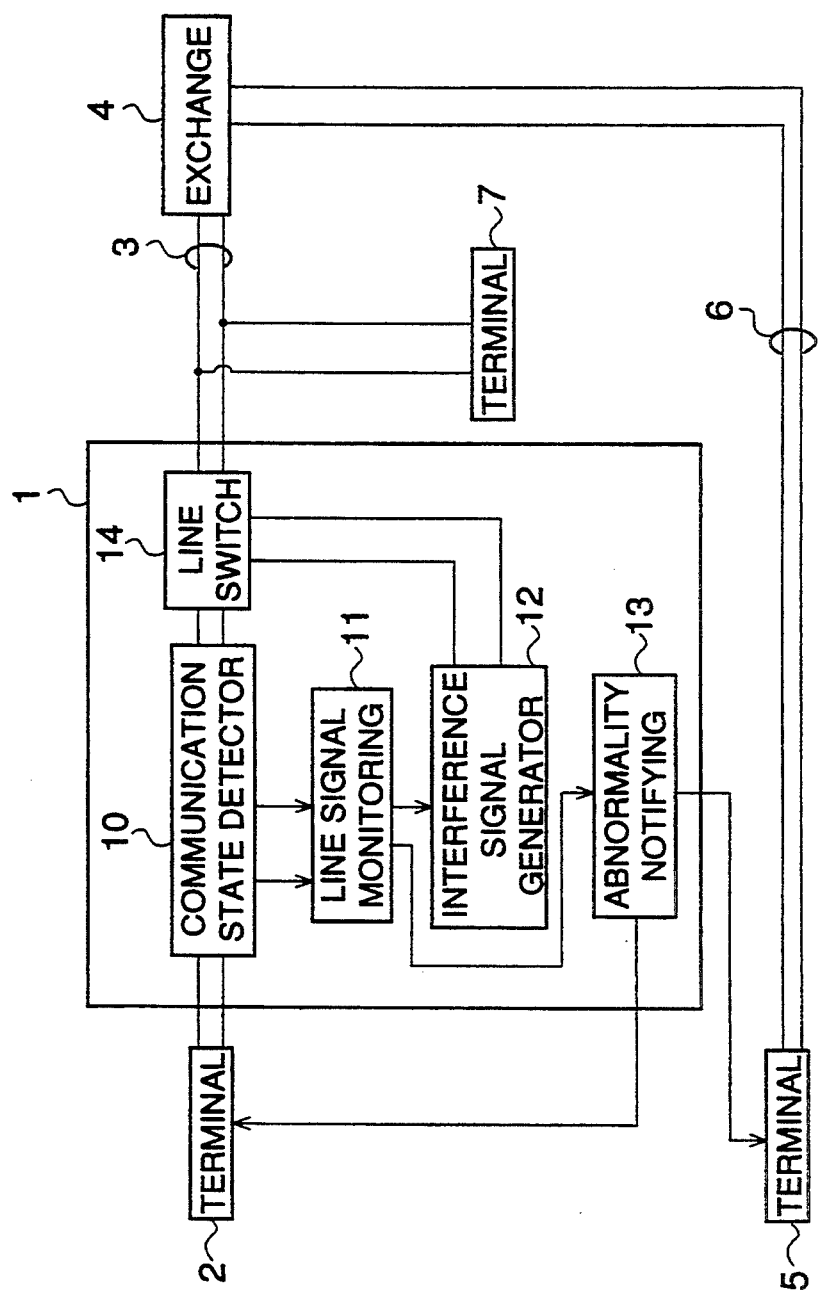
FIG. 1 is a system block diagram for explaining the operating principle of the present invention.

A basic construction shown in FIG. 1 includes a line branching detection controller 1, a communication terminal 2 of a an authorized (or legitimate) user, a line 3 which is indicated as two lines and is connected to the communication terminal 2, an exchange 4 of a public network, a communication terminal 5 for abnormality notification provided near the communication terminal 2 and is connected to the exchange 4 via an independent line 6, and a communication terminal 7 of an unauthorized (or illegal) user connected to the line 3 by line branching. The communication terminal 5 and the communication terminal 2 monitor each other so as to notify the exchange 4 of the line branching. The communication terminal 5 is used as a normal communication terminal when making no abnormality notification.

In the present invention, the line branching detection controller 1 is coupled to the communication terminal 2 of the authorized user and is connected to the exchange 4 via the line 3. The line branching detection controller 1 may be considered as a part of the communication terminal 2, and in this case, the line branching detection controller 1 is coupled to a main body of the communication terminal 2. On the other hand, the line branching detection controller 1 may be considered as a unit independent from the communication terminal 2. The line branching detection controller 1 includes a communication state detector 10, a line signal monitoring part 11, an interference signal generator 12, an abnormality notifying part 13, and a line switch 14.

In the present invention, when is detected that the communication terminal 2 of the authorized user will not make a communication using the line 3, signals on the line 3 are monitored. When an audio signal or the like is detected on the line 3, it is regarded that a line branching has been detected, and an interference signal is generated on the line 3 so as to interfere the communication performed by the communication terminal 7 of the unauthorized user. In addition, when the line branching is detected, an abnormality notification is made with respect to the communication terminal 2 of the authorized user.

The communication state detector 10 of the line branching detection controller 1 detects whether the communication terminal 2 of the authorized user is in a communication state or a non-communication state in which no communication is made. In this case, the communication state of the communication terminal 2 includes a state in which the authorized user has started a communication by a call-out or a call-in, a state in which a communication is being made, and a state in which a call signal has arrived via the line 3. The communication state detector 10 connects the line 3 to the communication terminal 2 when the communication state is detected. On the other hand, the communication state detector 10 periodically switches and connects the line 3 to the line signal monitoring part 11 when the non-communication state is detected. When the line 3 is switched and connected to the line signal monitoring part 11, the line signal monitoring part 11 detects the line branch by monitoring the signals on the line 3.

When the line signal monitoring part 11 detects the line branching, the line signal monitoring part 11 drives the interference signal generator 12. The interference signal generator 12 generates the interference signal after switching the line switch 14 so as to connect the line 3 to the interference signal generator 12, and sends the interference signal to the line 3 from the line switch 14. This interference signal is sent to the communication terminal 7 of the unauthorized user so as to interfere the communication thereof. Further, when the line branching is detected, the abnormality notifying part 13 is driven, and an abnormality notification is generated to notify the detection of the line branching with respect to the communication terminal 2 of the authorized user, and the abnormality notification is also simultaneously output with respect to the communication terminal 5 of the unauthorized user.

In this case, even if the communication terminal 2 of the authorized user receives the abnormality notification which indicates the detection of the line branching, it is impossible to notify the maintenance managing group of the exchange 4 because the line 3 is used by the unauthorized user. For this reason, the abnormality notification is made to the communication terminal 5 of the independently provided line 8. When the communication terminal 5 is notified that the line branching occurred in the line 3 of the communication terminal 2 of the authorized user, the communication terminal 5 calls the maintenance managing group of the exchange 4 by generating a selection number (dialing) the maintenance managing group. When the maintenance managing group of the exchange 4 answers the call, the communication terminal 5 makes the abnormal notification to notify that the line branch has occurred in the line 3.

Next, a description will be given of an embodiment of the communication terminal according to the present invention, by referring to FIG. 2.

Figure 2:
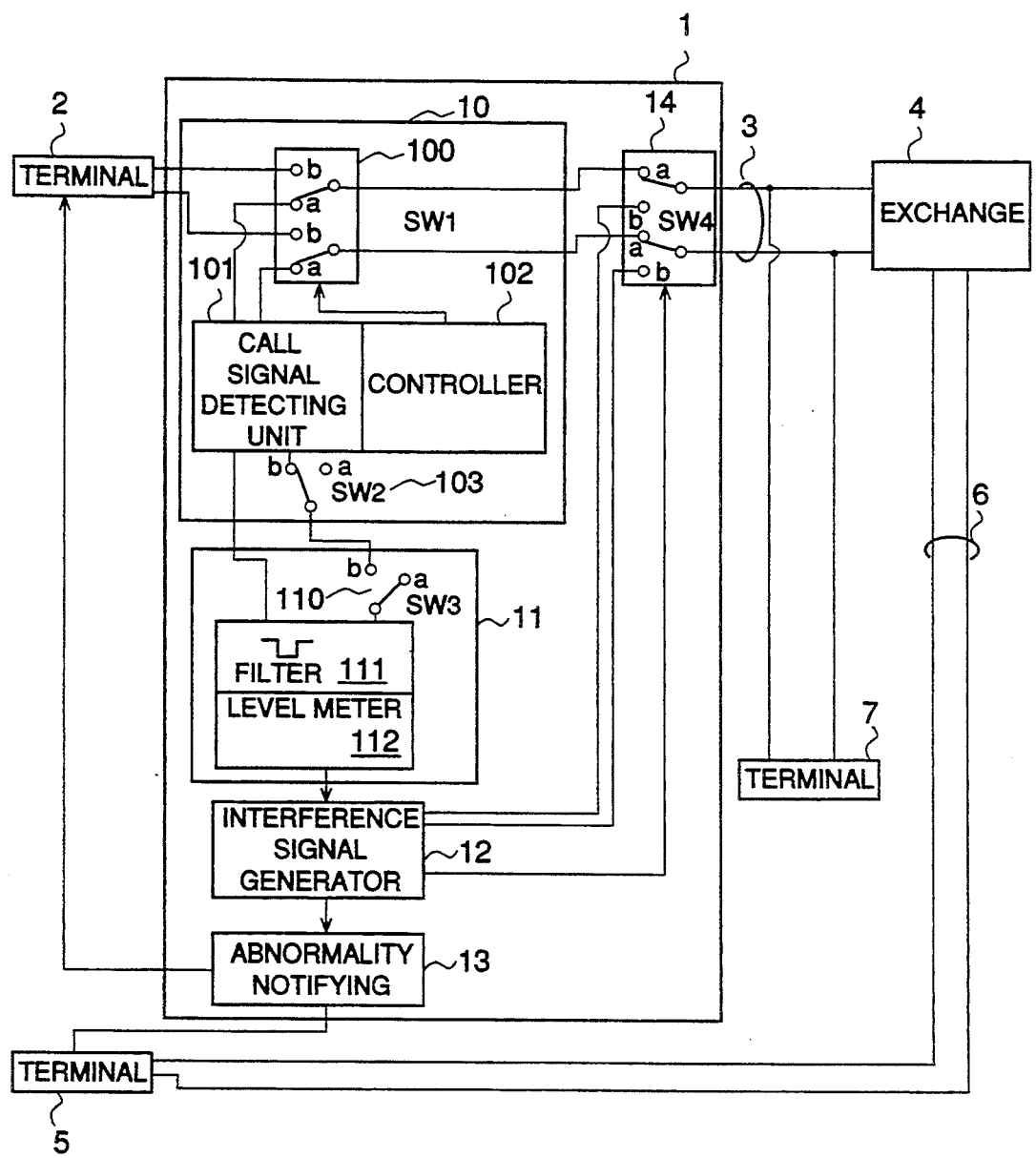
FIG. 2 is a system block diagram showing an embodiment of a communication terminal according to the present invention.

FIG. 2 shows the construction of this embodiment. In FIG. 2, those parts that are the same as those corresponding parts of FIG. 1 are designated by the same reference numerals (1 through 7 and 10 through 14), and a description thereof will be omitted. It is assumed in FIG. 2 that the communication terminals 2, 5 and 7 are telephone terminals, and that the lines 3 and 6 are telephone lines..

Referring to FIG. 2, the communication state detector 10 comprises a switch 100 (SW1) for switching to connect the line 3 to the communication terminal 2 of the authorized user or to draw the line 3 to the inside of the communication state detector 10, a call signal detecting unit 101, a controller 101 for controlling the switch 100, and a switch 103 (SW2) for switching to connect the drawn in line to the line signal monitoring part 11 or not to make this connection.

The line signal monitoring part 11 comprises a switch 110 (SW3) for connecting to the line via the communication state detector 10 at a predetermined period, a filter 111 for cutting off the frequency band of the dial tone, and a level meter 112 for checking the level of an input signal (an audio signal or a facsimile signal) and outputting a signal indicating the line branching when a predetermined level is detected. The inside of the line switch 14 is formed by a switch SW4.

All of the above switches SW1 through SW4 are switched and connected to the side of contacts a in an initial state where the communication terminal 2 of the authorized user is in a on-hook state and no line branching is detected.

A description will now be given of the operation of the above embodiment when the communication terminal 7 of the unauthorized user makes the line branching to the line 3, by referring to the following steps (1) through (10).

(1) In a case where the controller 102 of the communication state detector 10 detects the hooked state of the communication terminal 2 and the communication terminal of the authorized user is in the on-hook state where the handset is hooked and placed on the headset rest, the controller 103 controls the switch SW1 which switches the line 3 to switch and connect to the contacts a. Hence, the call signal detecting unit 101 monitors the call signal sent from the exchange 4 to the line 3.

(2) The controller 102 is driven when the call signal detecting unit 101 detects the call signal. In addition, when the off-hook state of the communication terminal 2 of the authorized user occurs, this is detected by the controller 102. The controller 102 controls the SW1 to switch and connect to contacts b so that the line 3 is connected to the communication terminal 2 when the call signal is detected or the off-hook state of the communication terminal 2 occurs. As a result, the authorized user can go through the normal call-in (receiving) process (being called by the call signal, answering, talking and the like) and the normal call-out (calling) process (dialing the exchange 4, connecting to the other party, talking and the like).

(3) In a state where the communication terminal 2 of the authorized user is not making the call-out/call-in process, that is, when the communication terminal 2 is in the on-hook state and no call signal is detected, the controller 102 controls the switch SW2 to switch and connect to the contact b, and the line 3 is connected to the line signal monitoring part 11.

(4) The line signal monitoring part 11 monitors the line by a polling. Hence, the switch SW3 is periodically turned ON/OFF by a timer (not shown).

(5) When the SW 3 is turned ON, a telephone line (a DC loop) is formed within the line signal monitoring part 11. In this state, if the line 3 is not being used by the unauthorized user by the line branching, the line signal monitoring part 11 only receives the dial tone sent from the exchange 4.

(6) The line signal is passed through the filter 111 so as to cut off only the frequency band (for example, 400 Hz) of the dial tone. Thereafter, the state of the input signal is detected by the level meter 112. When the audio signal, the facsimile signal and the like is detected as a signal other than the dial tone, the level meter 112 outputs a branching detection signal indicating that the line branching has been detected.

(7) When the branching detection signal is generated, the interference signal generator 12 and the abnormality notifying part 13 are driven. When the interference signal generator 12 is driven, the SW4 of the line switch 14 is switched and connected to the contacts b so that the interference signal generator 12 is connected to the line 3 and an interference signal is sent. For example, the interference signal may be a PB signal, a DP signal, an audio signal and the like, as long as the interference signal is capable of interfering the communication terminal 7 of the unauthorized user from forming a talk channel by the line branching or, is capable of interfering the communication content itself of the communication terminal 7 of the unauthorized user.

(8) The abnormality notifying part 13 which is activated at the same time as the sending of the interference signal notifies the authorized user that the line branching has been detected. More particularly, the notification to the authorized user is made by providing a lamp for this notification in the communication terminal 2 of the authorized user and turning this lamp ON or, by providing a prerecorded voice message in the abnormality notifying part 13 and playing back this prerecorded voice message. Of course, other methods may be used to make the notification to the authorized user.

(9) At the same time as the notification to the communication terminal 2 of the authorized user, the abnormality notifying part 13 makes the abnormality notification which indicates the detection of the line branching to the communication terminal 5 which is used for the abnormality notification and is in such a relationship with the communication terminal 2 so as to mutually notify the line branching.

(10) When the communication terminal 5 receives the abnormality notification, the communication terminal 5 dials a line (person in charge of the maintenance managing group) provided in the exchange 4 exclusively for notifying the detection of the line branching, so as to notify the detection of the line branching. In this state, the information (the telephone number and the like) relating to the authorized user of the line 3 is also notified. The person in charge of the exchange 4 will know the line in which the line branching has occurred by receiving this notification, and thus, this person can start an investigation to determine the exact location where the line branching is being made.

Figure 3:
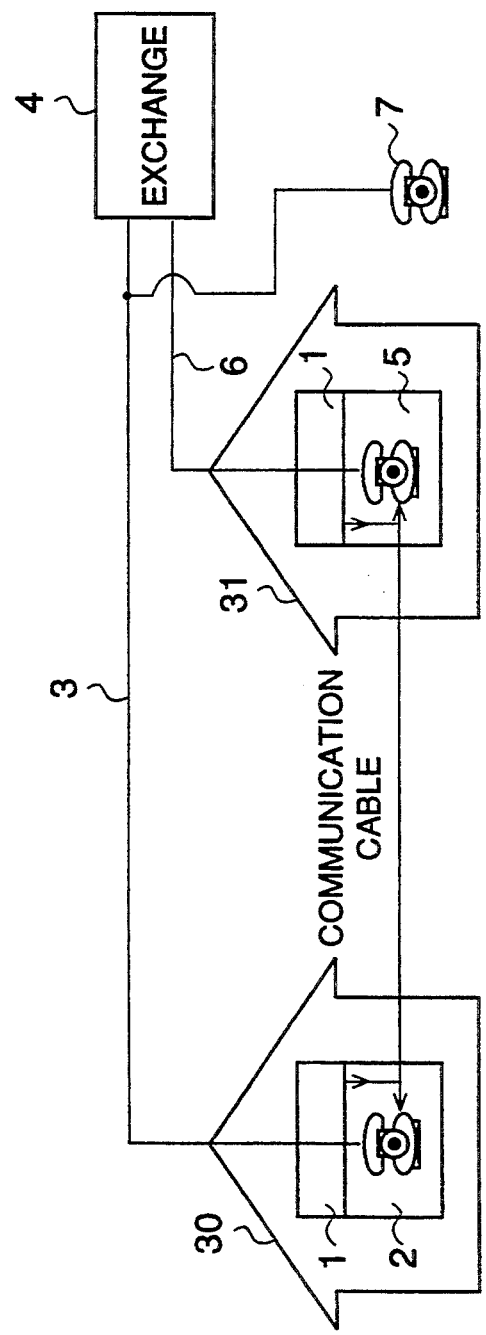
FIG. 3 is a diagram for explaining a case where the present invention is applied to two communication terminals provided in separate buildings.

FIG. 3 shows an application of the present invention to two communication terminals provided in separate buildings.

Referring to FIG. 3, those parts that are the same as those corresponding parts shown in FIG. 2 are designated by the same reference numerals, and a description thereof will be omitted. In this particular case, two communication terminals of the present invention are provided in separate buildings 30 and 31. The line branching detection controller 1 and the communication terminal 2 are provided in the building 30, and the line branching detection controller 1 and the communication terminal 5 are provided in the building 31. A communication cable which functions as an abnormality notification channel is also provided to connect the two communication terminals 2 and 5.

When the telephone line 3 connected to the communication terminal 2 of the authorized user is branched and connected to the communication terminal 7 of the unauthorized user and a communication is made using this communication terminal 7, this is detected by the line signal monitoring part 11 of the line branching detection controller 1 having the construction of the above described embodiment, and the abnormality notification is made with respect to the communication terminal 5 provided in the building 31. When the communication terminal 5 receives this abnormality notification, the communication terminal 5 automatically makes a call or the user of the communication terminal 5 makes a call so that the maintenance managing group of the exchange 4 is called by the dialing and is notified of the abnormality. When the telephone line 6 connected to the communication terminal 5 in the building 31 is branched and used without authorization, the line branching detection controller 1 coupled to the communication terminal 5 sends the abnormality notification to the communication terminal 2 so that the communication terminal 2 may notify the exchange 4 of the abnormality. In this way, the two communication terminals 2 and 5 maintain the relationship of monitoring each other.

As has been described, the present invention makes it possible to detect a line branching in real time and to send an interference signal immediately upon detection of the line branching. Hence, a communication made by unauthorized use of the line can be interfered by the interference signal. In addition, when the line branching is detected, it is possible to immediately notify the exchange of the line branching. Thus, the unauthorized person making the line branching can be located quickly, and turned in to the local authorities.

Further, the present invention is not limited to the above described embodiments, and variations and modifications may be made without departing from the scope of the present invention.

What is claimed is:

1. A communication terminal connected to a line of an exchange of a public network, said communication terminal comprising:
    a main body of the communication terminal; and
    a line branching detection controller coupled to said main body,
    said line branching detection controller comprising:
        a communication state detector for detecting a communication operation of the communication terminal and enabling the communication terminal to call and receive a call when the communication operation of the communication terminal is detected;
        a line signal monitoring part coupled to said communication state detector and being activated thereby when said communication state detector detects no communication operation, for monitoring signals on the line connected to the exchange; and
        an interference signal generator coupled to and being activated by said line signal monitoring part when said line signal monitoring part detects an audio signal excluding a dial tone from the exchange and indicating a communication made on the line from an unauthorized communication terminal and generating an interference signal on the line to interfere with communication from the unauthorized communication terminal.

2. The communication terminal as claimed in claim 1, wherein said line branching detection controller further comprises:
    an abnormality notifying part, coupled to said interference signal generator for notifying the main body of the communication terminal that a line branching is detected on the line,
    said interference signal generator activating said abnormality notifying part.

3. The communication terminal as claimed in claim 1, further including means to connect said line signal monitoring part to the line at predetermined time intervals so as to monitor signals other than a dial tone.

4. The communication terminal as claimed in claim 3, wherein said line signal monitoring part comprises:
    a filter for cutting off a frequency band of the dial tone generated from the exchange; and
    means for generating a detection signal which indicates a detection of a line branching from the line when a signal component is detected from an output of said filter,
    said interference signal generator being driven by said detection signal.

5. A line branching detection controller adapted to a communication terminal connected to a line of an exchange of a public network, said line branching detection controller comprising:
    a communication state detector for detecting a communication operation of the communication terminal and enabling the communication terminal to call and receive a call when the communication operation of the communication terminal is detected;
    a line signal monitoring part, coupled to said communication state detector and being activated thereby when said communication state detector detects no communication operation, for monitoring signals on the line connected to the exchange; and an interference signal generator coupled to and being activated by said line signal monitoring part when said line signal monitoring part detects an audio signal excluding a dial signal and indicating a communication made on the line from an unauthorized communication terminal and generating an interference signal on the line to interfere with communication from the unauthorized communication terminal.

6. The line branching detection controller as claimed in claim 5, which further comprises:

an abnormality notifying part, coupled to said interference signal generator, for notifying the communication terminal that a line branching is detected on the line when said audio signal is detected, said interference signal generator activating said abnormality notifying part.

7. The line branching detection controller as claimed in claim 5, and further comprising means to connect said line signal monitoring part to the line at predetermined time intervals so as to monitor signals other than a dial tone.

8. The line branching detection controller as claimed in claim 7, wherein said line signal monitoring part comprises:

a filter for cutting off a frequency band of the dial tone generated from the exchange; and means for generating a detection signal which indicates a detection of a line branching from the line when a signal component is detected from an output of said filter, said interference signal generator being driven by said detection signal.

9. A system for detecting a line branching from a first line of an exchange of a public network, said system comprising:

a first communication terminal connected to the first line; and a line branching detection controller coupled to said first communication terminal, said line branching detection controller comprising:

a communication state detector for detecting a communication operation of the first communication terminal and enabling the first communication terminal to call and receive a call when a communication operation of the first communication terminal is detected;

a line signal monitoring part coupled to said communication state detector and being activated thereby when said communication state detector detects no communication operation, for monitoring signals on the first line connected to the exchange; and an interference signal generator coupled to and being activated by said line signal monitoring part when said line signal monitoring part detects an audio signal excluding a dial signal from the exchange and indicating a communication made on the first line from an unauthorized communication terminal and generating an interference signal on the first line to interfere with communication with said unauthorized communication terminal.

10. The system as claimed in claim 9, wherein said line branching detection controller further comprises:

an abnormality notifying part, coupled to said interference signal generator, for notifying the first communication terminal that a line branching is detected on the first line when said audio signal is detected, said interference signal generator activating said abnormality notifying part.

11. The system as claimed in claim 9, further comprising means to connect said line signal monitoring part to the first line at predetermined time intervals so as to monitor signals other than a dial tone.

12. The system as claimed in claim 11, wherein said line signal monitoring part comprises:

a filter for cutting off a frequency band of the dial tone generated from the exchange; and means for generating a detection signal which indicates a detection of a line branching from the first lin when a signal component is detected from an output of said filter, said interference signal generator being driven by said detection signal.

13. The system as claimed in claim 10, which further comprises:

a second communication terminal, located near said first communication terminal and connected to the exchange via a second line which is independent from said first line, said abnormality notifying part notifying the detection of the line branching to said second communication terminal in response to the activation of said interference signal generator, said second communication terminal calling the exchange to notify the detection of the line branching depending on the notification received from said abnormality notifying part.

* * * * *